United States Patent
Kuang et al.

(10) Patent No.: US 11,454,412 B2
(45) Date of Patent: Sep. 27, 2022

(54) HVAC SYSTEM AND CONTROL METHOD THEREOF

(71) Applicant: Carrier Corporation, Palm Beach Gardens, FL (US)

(72) Inventors: YuHui Kuang, Shanghai (CN); QiaoHui Shi, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 35 days.

(21) Appl. No.: 17/053,926

(22) PCT Filed: Apr. 23, 2019

(86) PCT No.: PCT/IB2019/000596
§ 371 (c)(1),
(2) Date: Nov. 9, 2020

(87) PCT Pub. No.: WO2019/215513
PCT Pub. Date: Nov. 14, 2019

(65) Prior Publication Data
US 2021/0262686 A1  Aug. 26, 2021

(30) Foreign Application Priority Data
May 10, 2018  (CN) .......................... 201810442329.1

(51) Int. Cl.
*F24F 11/63*  (2018.01)
*F24F 11/77*  (2018.01)
(Continued)

(52) U.S. Cl.
CPC ............ *F24F 11/63* (2018.01); *F24F 5/0003* (2013.01); *F24F 11/77* (2018.01); *F24F 11/84* (2018.01);
(Continued)

(58) Field of Classification Search
CPC .......... F24F 11/63; F24F 5/0003; F24F 11/77; F24F 11/84; F24F 2110/10;
(Continued)

(56) References Cited

U.S. PATENT DOCUMENTS 6,792,766 B2  9/2004  Osborne et al.
8,147,301 B2  4/2012  Ghattas
(Continued)

FOREIGN PATENT DOCUMENTS

CN  103968481 A    8/2014
CN  104713205 A  *  6/2015
(Continued)

OTHER PUBLICATIONS

International Search Report and Written Opinion for Application No. PCT/IB2019/000596; dated Sep. 26, 2019; 17 Pages.

*Primary Examiner* — Chad G Erdman
(74) *Attorney, Agent, or Firm* — Cantor Colburn LLP

(57) ABSTRACT

The present application discloses a control method for an HVAC system in a relatively large spatial place and the HVAC system. The HVAC system comprises an air handling unit, and the air handling unit is provided with a valve through which a fluid medium passes and a fan; and the method comprises: monitoring a return air temperature of air circulated back to the air handling unit; providing a return air temperature setpoint of the HVAC system; and performing decoupling adjustment on one of the fan and the valve, and then adjusting the other of the fan and the valve so that the return air temperature is close to the return air temperature setpoint. According to the present application, the HVAC system can operate in a steady and energy-saving way.

8 Claims, 1 Drawing Sheet

(51) Int. Cl.
*F24F 11/84* (2018.01)
*F24F 5/00* (2006.01)
*G05B 19/4155* (2006.01)
*G05D 7/06* (2006.01)
*F24F 110/10* (2018.01)

(52) U.S. Cl.
CPC ....... *G05B 19/4155* (2013.01); *G05D 7/0635* (2013.01); *F24F 2110/10* (2018.01); *G05B 2219/2614* (2013.01)

(58) Field of Classification Search
CPC ... F24F 2140/20; F24F 11/46; G05B 19/4155; G05B 2219/2614; G05D 7/0635; Y02B 30/70
See application file for complete search history.

(56) References Cited

U.S. PATENT DOCUMENTS

| | | | |
|---|---|---|---|
| 8,406,929 B2 | 3/2013 | Duncan | |
| 8,872,379 B2 | 10/2014 | Ruiz et al. | |
| 9,291,358 B2 | 3/2016 | Federspiel et al. | |
| 9,400,119 B2 | 7/2016 | Malloy | |
| 9,568,924 B2 | 2/2017 | Federspiel | |
| 9,581,985 B2 | 2/2017 | Walser et al. | |
| 9,791,837 B2 | 10/2017 | Slessman et al. | |
| 2007/0289322 A1 | 12/2007 | Mathews | |
| 2008/0142610 A1* | 6/2008 | Bastow | F24D 5/10 237/69 |
| 2009/0243535 A1 | 10/2009 | Erdmann et al. | |
| 2012/0016526 A1* | 1/2012 | Burton | F24F 11/80 700/278 |
| 2013/0151019 A1 | 6/2013 | Federspiel | |
| 2017/0234559 A1 | 8/2017 | Federspiel et al. | |
| 2017/0241657 A1 | 8/2017 | Salsbury et al. | |

FOREIGN PATENT DOCUMENTS

| | | | |
|---|---|---|---|
| CN | 207268524 U | | 4/2018 |
| JP | H0510566 A | | 1/1993 |
| JP | H11173631 A | * | 7/1999 |
| WO | 2011049905 A1 | | 4/2011 |
| WO | 2018011761 A1 | | 1/2018 |

* cited by examiner

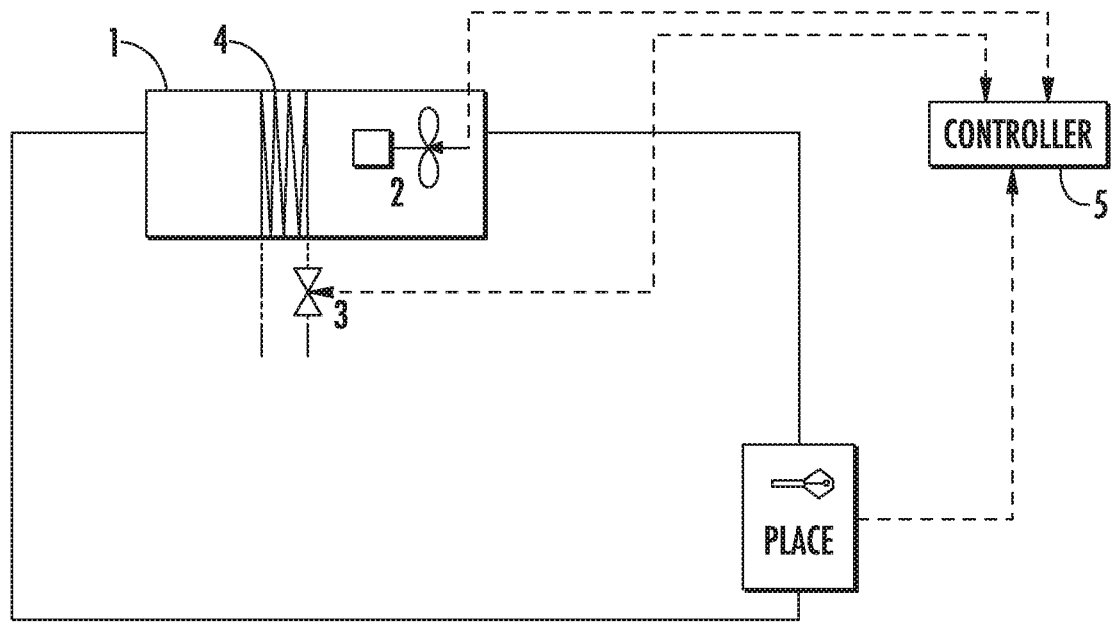

HVAC SYSTEM AND CONTROL METHOD THEREOF

CROSS-REFERENCE TO RELATED APPLICATIONS

This application is a 371 U.S. National Stage application of PCT/IB2019/000596, filed Apr. 23, 2019, which claims the benefit of Chinese Patent Application No. 201810442329.1, filed May 10, 2018, both of which are incorporated by reference in their entirety herein.

TECHNICAL FIELD

The present application relates to a heating, ventilation, and air conditioning system, and to a control method for the system.

BACKGROUND

A heating, ventilation, and air conditioning (HVAC) system includes an air handling unit (or referred to as an air handling set), and the air handling unit is generally provided with an air supply fan located at an air outlet. The fan supplies cold or warm air. How to control an HVAC system in a large place to provide a comfortable environment temperature is a complex subject. Especially in a large-scale underground project such as a subway station, due to lack of a heat exchange device at a tail end, a fan directly supplies handled air to a station platform and a station hall. Although the fan is provided with a frequency converter, the fan has to operate at a fixed speed because there is no suitable control method. In addition, the fan and a valve through which cold water flows in a water system of the HVAC system are controlled in a coupled manner, and once the HVAC system is not under a good control, coupling between the fan and the valve will lead to system oscillation. Moreover, this causes the actual environment temperature to excessively deviate from a comfortable temperature value, and consequently the system continuously operates at a high energy consumption.

SUMMARY OF THE INVENTION

One aspect of the present application provides a control method for an HVAC system in a relatively large spatial place. The HVAC system comprises an air handling unit, and the air handling unit is provided with a valve through which a fluid medium passes and a fan; and the method comprises:

monitoring a return air temperature of air circulated back to the air handling unit;

providing a return air temperature setpoint of the HVAC system; and performing decoupling adjustment on one of the fan and the valve, and then adjusting the other of the fan and the valve so that the return air temperature is close to the return air temperature setpoint.

Another aspect of the present application provides an HVAC system using the foregoing control method.

Through optimized decoupling control of a fan and a valve, the HVAC system can operate in a steady and energy-saving way. This is very favorable for a large-space air-conditioning system to adapt to a variety of load conditions, so that the system obtains best conditions. In a subway station space, the present application can provide a rapid response to a cooling load change of the system, so as to meet people's comfort requirements.

Through the following detailed descriptions with reference to the accompanying drawing, other aspects and features of the present application become apparent. However, it should be noted that the accompanying drawing is designed only for explanation and is not intended to limit the scope of the present application, because for details thereof, reference should be made to the appended claims. It should further be noted that the accompanying drawing is only intended to conceptually illustrate a structure and a process described herein, and unless noted otherwise, it is not necessary to draft the accompanying drawing according to the scale.

BRIEF DESCRIPTION OF THE DRAWINGS

With reference to the following detailed description of specific embodiments in conjunction with the accompanying drawing, the present application is more fully understood. The same reference numeral in the accompanying drawing always represents the same element in the FIGURE.

FIG. 1 is a schematic diagram of an embodiment of an HVAC system according to the present application, where a solid line refers to an air line, a dashed line refers to a signal transmission line, and a double dot dash line is a water system line.

DETAILED DESCRIPTION

To help a person skilled in the art to understand a subject matter claimed by the present application, the specific embodiments of the present application are described in detail below with reference to the accompanying drawing.

An HVAC system in the present application is used in an air conditioning system in a relatively large spatial place, especially in a subway station. Referring to FIG. 1, a tail end device of an HVAC system in the present application is an air handling unit 1, wherein the air handling unit 1 is provided with a fan 2 and a valve 3, and handled air passes through the fan 2 and then leaves the air handling unit 1 as supplied air. After being circulated, air returns to the air handling unit 1 as return air and is handled again in the unit. The fan is provided with a frequency conversion driver, the fan 2 is controlled by the frequency conversion driver to operate at a variable speed, thereby changing a flow rate of air passing through the fan 2. The valve 3 controls a fluid medium, that is, cold water, flowing through a cold water coil pipe 4 in the air handling unit 1. When the water system operates, air is cooled after flowing through the cold water coil pipe, then enters the fan 2, and is sent out of the air handling unit 1 by the fan 2.

In the present application, decoupling control is performed on the fan 2 and the valve 3, that is, the fan 2 and the valve 3 are independently controlled. The to-be-controlled valve 3 is disposed at an air outlet of the air handling unit 1, and a flow rate of cold water entering the cold water coil pipe may be changed by changing a position of the valve 3, thereby changing a temperature of air passing through the cold water coil pipe. In the present application, an operating speed of the fan 2 and an opening degree of the valve 3 are controlled respectively, and control on one of the fan 2 and the valve 3 is independent of control on the other. In the present application, control on the fan 2 includes operating speed adjustment of the fan 2, and control on the valve 3 includes opening degree adjustment of the valve 3. No matter which one of the fan 2 and the valve 3 changes in parameter, air temperature at the air outlet is affected. The present application provides a set of optimized control strategy to adjust the parameters of the fan 2 and the valve 3 separately, so that the temperature in an environment is close to an ideal value. The HVAC system may be provided with a controller 5, and the controller 5 is connected to the fan 2 and the valve 3 in a communication way, receives signals from the fan 2 and the valve 3, and sends instructions to the fan 2 and the valve 3, as shown in FIG. 1. The controller 5 may be disposed as an independent component as shown in the FIGURE, or may be integrated into a control unit of the entire HVAC system.

When the fan 2 and the valve 3 need to be adjusted, one of the fan 2 and the valve 3 may be adjusted first to an end value, and the other of the fan 2 and the valve 3 is then adjusted. In this way, working statuses of the fan 2 and the valve 3 can satisfy an actual demand and energy consumption is reduced. Moreover, both the fan 2 and the valve 3 may work within reasonable parameter ranges respectively, so as to avoid system oscillation caused by coupling between the fan 2 and the valve 3.

When the air temperature at the air outlet needs to be decreased, the flow rate and the flow velocity of air are increased to improve cold air supply. Specifically, the opening degree of the valve 3 is first increased to a maximum value, and the speed of the fan 2 is then adjusted. When the air temperature at the air outlet needs to be increased, the flow rate and the flow velocity of air are decreased to reduce cold air supply. Specifically, the speed of the fan 2 is decreased first to a minimum value, and the opening degree of the valve 3 is then adjusted. The minimum value of the speed of the fan 2 may be preset or may be a threshold set based on a working condition of the fan 2. During adjustment of the fan 2, the speed of the fan 2 may be increased or decreased step by step, for example, adjusted step by step by setting a step time.

The controller 5 adjusts the fan 2 and the valve 3 based on the return air temperature. The return air temperature may be the temperature of return air monitored at an air return port of the air handling unit, or monitored indoor temperature. If the monitored return air temperature is the monitored indoor temperature, the monitored return air temperature may be collected by arranging a plurality of monitoring points. For example, in subway, temperatures at a plurality of positions in a station platform and a station hall are monitored, and an average value of data of these monitoring points or most unfavorable data is selected as the return air temperature. When the detected return air temperature is increased, it indicates that temperatures in the station platform and the station hall are not low enough, and it is necessary to increase cold air supply, and therefore the opening degree of the valve 3 and the speed of the fan 2 are sequentially increased. When the detected return air temperature is in a downtrend, it indicates that temperatures in the station platform and the station hall are excessively low, and it is necessary to reduce cold air supply, and therefore the opening degree of the valve 3 and the speed of the fan 2 are sequentially decreased. It should be understood that in this example, orders of adjusting the fan 2 and the valve 3 may be interchanged.

An ideal return air temperature value may be set in the system, and the temperature value represents a temperature at which a human body feels comfortable. The fan 2 and the valve 3 are adjusted, so that an actual return air temperature is close to the set value of the ideal return air temperature.

A person skilled in the art may conclude that the control method in the present application is also applicable to an HVAC system in other large places, including a shopping mall, an airport, a supermarket, and etc. In addition, based on the foregoing concept, the present application may also be applied to a case where an HVAC system provides warm air. In this case, a fluid medium passing through the valve 3 is a hot medium, such as hot water supplied by a boiler, and decoupling control may also be performed on the fan 2 and the valve 3 by using the foregoing method. To be specific, one component of the fan 2 and the valve 3 is adjusted first to a specific value, and the other component of the fan 2 and the valve 3 is then adjusted. For example, when the actual return air temperature is increased, it indicates that the temperature of the environment is excessively high, and it is necessary to reduce a flow velocity and a flow rate of warm air, and in this case, the speed of the fan 2 is first decreased to the minimum value step by step, and then the opening degree of the valve 3 is decreased. When the actual return air temperature is decreased, it indicates that the temperature of the environment is not high enough, and it is necessary to increase the flow rate and the flow volume of the warm air, and therefore the opening degree of the valve 3 is first increased to the maximum value, and then the speed of the fan 2 is increased step by step. It should be understood that in this example, orders of adjusting the fan 2 and the valve 3 may be interchanged.

Opening degree adjustment of the valve 3 may be determined based on a supply air temperature and a specified value of the supply air temperature. The specified value of the supply air temperature is determined based on a return air temperature and a specified value of the return air temperature. The foregoing control may be implemented through dual PID (proportional-integral-differential (controller)) closed-loop control. For a first PID control loop, a monitored return air temperature and a preset return air temperature value preset in the system are input, and after the monitored return air temperature and the preset return air temperature value are compared, a calculated preset supply temperature value is output. In a second PID control loop, a monitored actual supply temperature and the output of the last PID (i.e., the preset supply temperature value) are input, and after the monitored actual supply temperature and the preset supply temperature value are compared, a calculated opening degree of the valve is output.

A plurality of air handling units may be arranged in an HVAC system in a large place. In the present application, a fan and a valve of each air handling unit may be adjusted.

Although the specific embodiments of the present application have been shown and described in detail to illustrate a principle of the present application, it should be understood that the present application may be implemented in another way without departing from such a principle.

The invention claimed is:

1. A control method for an HVAC system in a relatively large spatial place, wherein the HVAC system comprises an air handling unit, and the air handling unit is provided with a valve through which a fluid medium passes and a fan; and the method comprises:

monitoring a return air temperature of air circulated back to the air handling unit;

providing a return air temperature setpoint of the HVAC system; and performing decoupling adjustment on one of the fan and the valve, and then adjusting the other of the fan and the valve so that the return air temperature is close to the return air temperature setpoint;

wherein opening degree adjustment of the valve is determined based on a supply air temperature of air leaving the air handling unit and a supply air temperature setpoint of the HVAC system;

wherein adjustment on the fan and the valve comprises:
increasing a speed of the fan after increasing the opening degree of the valve to a maximum value; and
decreasing the opening degree of the valve after decreasing a speed of the fan to a minimum value.

2. The control method according to claim 1, wherein the opening degree adjustment of the valve further comprises determining the supply air temperature setpoint based on the return air temperature and the return air temperature setpoint.

3. The control method according to claim 1, wherein the opening degree adjustment of the valve is implemented via a PID control method.

4. The control method according to claim 1, wherein adjustment on a speed of the fan comprises increasing the speed of the fan step by step or decreasing the speed of the fan step by step.

5. The control method according to claim 1, wherein the fan is configured to be a frequency conversion fan.

6. The control method according to claim 1, wherein the fan is configured to cause air passing through the fan to leave the air handling unit; and the valve is configured to be adjacent to an air outlet of the air handling unit and to adjust a flow volume of the fluid medium that exchanges heat with air that is about to enter the fan.

7. The control method according to claim 1, wherein monitoring of the return air temperature comprises monitoring an air temperature at a return air port of the air handling unit or monitoring a plurality of environment temperatures in the relatively large spatial place.

8. An HVAC system, wherein the system is disposed inside a subway station and uses the control method according to claim 1.

* * * * *